United States Patent [19]

Conant

[11] Patent Number: 4,692,602

[45] Date of Patent: Sep. 8, 1987

[54] APPARATUS FOR SENSING AND/OR WRITING INFORMATION ON CARDS, PASSPORTS AND CHECKS AND THE LIKE

[75] Inventor: Curtis T. Conant, Rancho Palos Verdes, Calif.

[73] Assignee: American Magnetics Corporation, Carson, Calif.

[21] Appl. No.: 737,198

[22] Filed: May 23, 1985

[51] Int. Cl.[4] .............................................. G06K 7/08
[52] U.S. Cl. ........................................ 235/446; 360/2
[58] Field of Search ................... 360/2; 235/449, 482, 235/485

[56] References Cited

U.S. PATENT DOCUMENTS

| | | | |
|---|---|---|---|
| 4,031,359 | 6/1977 | Christou | 360/2 |
| 4,259,699 | 3/1981 | Yoshida | 360/2 |
| 4,288,825 | 9/1981 | Hasuo | 360/2 |

*Primary Examiner*—Harold I. Pitts
*Attorney, Agent, or Firm*—Marmorek, Guttman & Rubenstein

[57] ABSTRACT

A multimedia reader and/or writer such as a credit card reader is adapted to receive media of different thicknesses, such as checks, cards and passports. The medium enters a channel defined by walls or rails, one of which includes a spring loaded section which adjusts to the different thicknesses. The medium moves against a wear plate which includes striations to guide the edge of the medium away from the spring loaded section in order to avoid catching the medium.

5 Claims, 1 Drawing Figure

APPARATUS FOR SENSING AND/OR WRITING INFORMATION ON CARDS, PASSPORTS AND CHECKS AND THE LIKE

FIELD OF THE INVENTION

This invention relates to credit card readers and the like, and, more particularly to such readers adapted for accepting media of different thicknesses.

BACKGROUND OF THE INVENTION

Apparatus for reading and writing information on cards and checks is a familiar sight at many point of sale terminals and banks. An automatic teller machine (ATM), for example, is adapted to read patron identification cards. The ATM is adapted to receive the familiar plastic banking card and to read the patron identification number on the magnetic stripe which the card bears. Such machines are adapted to receive only identification cards of a particular size and thickness.

Similarly, check readers are known also. An operator of a check reader typically guides a check into a slot defined by two spaced apart rails. The rails are supported by a wear plate which acts as a bearing surface against which the edge of the check is pushed. Sensors are supported on one of the rails in a position in registry with the identification code on the check.

Most readers of this type are adapted to operate on items with a particular set of geometric characteristics. Thus, a card reader is adapted to accept only credit card-type items whereas check readers are adapted to receive the thinner, more flexible check, but not cards.

A single reader (or writing) apparatus adapted to be operative with items having a variety of thicknesses presents a variety of problems. One such problem relates to the positioning of the operating elements of the reader in a manner to accept identification media having a variety of thicknesses. This problem has been resolved by employing first and second rails in fixed, opposing positions, spaced apart a distance to accept identification media of maximum thickness. The rails are affixed to a wear plate against which the medium is pressed when it is passed between the rails. A platen is spring mounted on the first rail in a position closely spaced with respect to the second rail. Thus, the second rail and the platen form a spring loaded slot which accommodates itself to media of different thicknesses. The first rail is adapted to receive the platen when a thick medium urges the platen into its extreme position.

Further, sensing and write heads are spring mounted individually to accommodate the media of different thicknesses. The platen is apertured to permit the heads to extend through the platen to contact information on a medium. The heads are suspended by parallel spring arrangements which maintain the heads in proper alignment even though they are free to move along an axis normal to the medium to accommodate to the different media thicknesses. The multiple media apparatus of this type require that the platen be free to move to accommodate a variety of media thicknesses. Consequently, the platen has to be spaced apart from the wear plate against which the edges of the media are urged when one of such media is passed between the rails. A serious problem arises when a check is moved between the rails. The edge of the check buckles under the platen. A reduction of the separation between the platen and the wear plate to reduce the opportunity for the edge of the check to move under the platen instead cause the check to catch and tear. In the first instance, misalignment of the heads and the information on the medium occurred. In the second instance, the apparatus could not be used for checks at all.

BRIEF DESCRIPTION OF THE INVENTION

A multiple media read/write apparatus is adapted to read indicia on thin media such as checks by including a wear plate which includes striations at an angle to the platen. The striations are of a depth and at an orientation with respect to the platen to engage the edge of the check and to guide that edge away from the platen and towards the opposing rail which abuts the wear plate.

DETAILED DESCRIPTION

Figure 1:
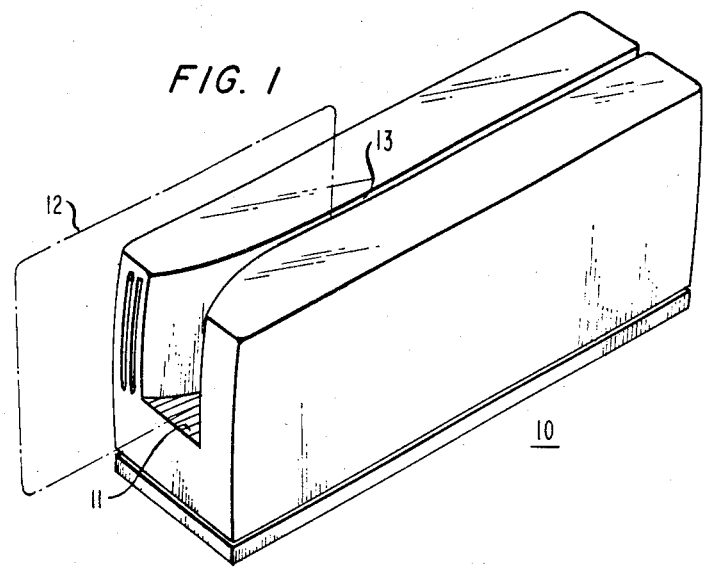
FIG. 1 is a plan view of an illustrative multimedia reader in accordance with this invention.

FIG. 1 shows a multimedia reader, 10, in accordance with this invention. The reader comprises a wear plate, 11, which bears against the edge of a check, bank passbook or credit card, 12, which is to be read. A check, for example, enters an acceptance slot defined by first and second opposing rails, 13 and 14, as indicated in the Figure. The various elements and their positions are most clearly shown in a top view of FIG. 2.

Figure 2:
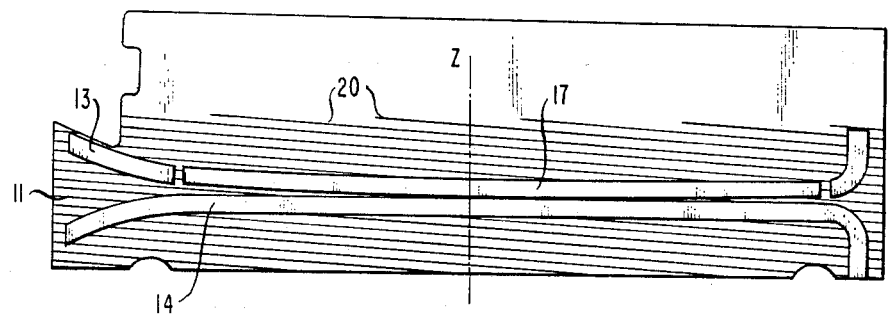
FIGS. 2 and 3 are top and side view of portions of the reader of FIG. 1.
Figure 3:
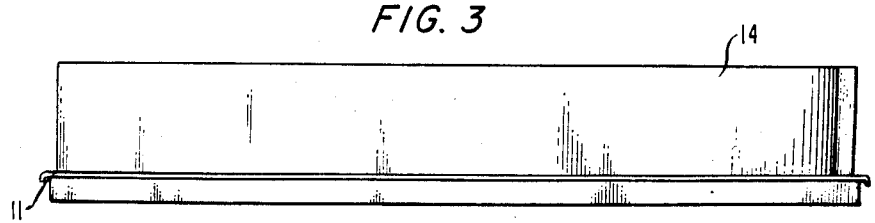

FIG. 3 shows a side view of rail 14 and its relationship to wear plate, 11. Notice that rail 14 is solid and abuts wear plate 11. From FIG. 2 it is clear that rail 13 is not solid. Instead, platen 17 is spring loaded with respect to rail 13 so that a medium entering the slot between the rails, as shown by card 12 of FIG. 1, can adjust the spacing between the platen and rail 14. The platen is suspended to move along on axis Z normal to rail 14 as shown in FIG. 2. The platen thus is moved by the medium to be read so that the distance between the platen and rail, 14, adjusts to accept media of different thicknesses.

Wear plate 11 of FIG. 2 can be seen to include striations, 20. The striations are oriented at an angle, illustratively of about three degrees with respect to the opposing faces of rails 13 and 14. Also, the striations are oriented towards rail 14 such that the edge of a check entering slot 13, as indicated in FIG. 1, engages the striations. As a consequence, the edge of the check is urged away from the platen and does not get lodged in the space between the platen and the wear plate, which space is provided to permit the platen to move. The striations are achieved conveniently by performing a single pass with a belt sander using 180 grit belt and orienting the belt at three degrees or more with respect to a line aligned with the position on the wear plate to which the abutting rail (14 of FIG. 1) is to be affixed. The surface roughness (the lines of the striation) shall be per American Standard, which is the arithmetical average (AA) deviation from the mean surface. The value of roughness shall lie between the values of 80 to 150 for the striations.

What is claimed is:

1. A multimedia apparatus for writing and/or reading information on a medium and adapted to accept media of different thicknesses, first and second rail means spaced apart from one another in opposition in a manner to define an acceptance slot of maximum width therebetween, said apparatus also including a wear plate against a first surface of which the edge of a medium is urged when passed through said acceptance slot, at least a portion of said first surface including striations of a depth and at an angle to said opposing rail means.

2. Apparatus in accordance with claim 1 wherein said second rail is adapted to support a platen, said platen being movable with respect to said second rail into close proximity to said first rail and being adapted to move away from said first rail when so urged by a medium of relatively thick geometry moved into said acceptance slot, said platen being separated from said wear plate to permit movement thereof by said medium.

3. Apparatus in accordance with claim 2 wherein said striations are aligned at an angle to urge the edge of a medium contacting said wear plate towards said first rail.

4. Apparatus in accordance with claim 3 wherein said striations are at an angle of three degrees or more with respect to said first rail.

5. Apparatus in accordance with claim 4 wherein said striations provide a surface roughness which lies between the values of 80 to 150.

* * * * *